United States Patent

[11] 3,574,989

| [72] | Inventors | Louis Rousseau;<br>Joseph Rousseau, 8, Avenue August Wissel,<br>Neuville sur Saone, Rhone, France |
|---|---|---|
| [21] | Appl. No. | 645,184 |
| [22] | Filed | June 12, 1967 |
| [45] | Patented | Apr. 13, 1971 |

[54] ROTOR-TYPE GRINDER
5 Claims, 16 Drawing Figs.

[52] U.S. Cl. .................................................. 56/10.7,
56/29, 37/91, 37/189, 56/11.9, 56/14.9
[51] Int. Cl. ........................................................ A01d 35/24
[50] Field of Search .......................................... 37/91—94,
189, 80, 67; 56/26, 25, 294, 29; 299/79, 87, 89, 90; 74/190

[56] References Cited
UNITED STATES PATENTS

| 872,220 | 11/1907 | Boyer | 74/190 |
|---|---|---|---|
| 1,051,255 | 1/1913 | Peterson | 74/190X |
| 1,762,441 | 6/1930 | Johnson | 37/92 |
| 2,360,334 | 10/1944 | Engel et al. | 37/81 |
| 2,542,474 | 2/1951 | Burchett | 37/92 |
| 2,659,585 | 11/1953 | McCallum | 299/89X |
| 2,705,379 | 4/1955 | Fruhling | 37/189X |
| 2,882,978 | 4/1959 | Smith et al. | 56/26X |
| 2,929,190 | 3/1960 | Woody | 56/26X |
| 2,969,601 | 1/1961 | McMaster | 37/91X |
| 3,020,694 | 2/1962 | Foshee et al. | 56/26 |
| 3,184,085 | 5/1965 | Randall et al. | 214/138 |
| 2,777,268 | 1/1957 | Breed | 56/26 |
| 3,181,619 | 5/1965 | Smith et al. | 56/25UX |
| 3,102,376 | 9/1963 | Henderson | 56/294 |
| 3,139,918 | 7/1964 | Gronberg | 56/294X |
| 3,402,541 | 9/1968 | Panek et al. | 56/294 |

*Primary Examiner*—Robert E. Pulfrey
*Assistant Examiner*—Clifford D. Crowder
*Attorney*—Tab T. Thein

ABSTRACT: Rotor-type grinder attachable to a tractor and the like vehicle, for carrying at the end of a supporting arm a rotary grinder for chopping parasitic vegetation and the like. Mechanisms are provided for adjusting the position of the tool relative to the vehicle and the soil. The supporting arm has a telescoping system actuated by hydraulic cylinders, for moving the tool toward and away from the vehicle. A gear system is provided for imparting rotational movement to the tool with respect to the supporting arm. Preferably, a linkage is secured between the vehicle and a portion of the arm, intermediate the vehicle and the tool, and hydraulic cylinders for adjusting the angular position of the linkage and thereby raising the lowering the tool together with the arm.

Patented April 13, 1971　　　　　　　　　　　3,574,989

INVENTORS:
Louis Rousseau
　　　　et al.
BY
　Agent

INVENTORS:
Louis Rousseau
et al.
BY
Agent

Patented April 13, 1971  3,574,989

INVENTORS
Louis Rousseau
et al.

BY Zabtheim
Agent

Patented April 13, 1971  3,574,989

INVENTORS:
Louis Rousseau
et al.
BY Zabthein
Agent fig.10

INVENTORS:
Louis Rousseau
et al.
BY

ROTOR-TYPE GRINDER

The present invention relates to improvements in rotor-type or rotary grinders and cutters, to be used in conjunction with a tractor, and equipped with a supporting or carrying arm which acts as a tool holder for rotary grinders, grinding units, cutting units and the like. The supporting arm allows the aforementioned units to be raised and lowered with respect to the soil, advanced and retracted with respect to the trailing tractor, angularly adjusted and also rotated to any position and angle which suits the particular job to be performed.

In one particular, exemplary arrangement according to the invention, the apparatus is fitted, at the end of the supporting arm, with a rotary grinder for chopping parasitic vegetation and the like, including a shaft provided with articulated knives or cutters which form a grinding unit and which may have one or more rotors capable of carrying a loading hood for receiving the crushed or ground products.

The grinding units are designed to be hitched to or mounted directly on wheel- or caterpillar-type tractors.

In the case of a mounted grinding unit, the crushing of vegetals growth on uneven terrain of difficult access, e.g. on slopes or embankments, or in trenches, has necessitated placement of the grinding unit at the end of the extension or supporting arm that can oscillate or pivot around its attaching point to the carrying vehicle, thus permitting operation in any desired position.

The improvements constituted by this embodiment of the invention are characterized by:

1. The articulated attachment of the grinding unit at the end of the supporting arm, so as to permit operation at any angle and in any position, enabling particularly the cutting of upground growth such as hedges or cornstalks and, equally, vegetation in pits, trenches or hollows. The grinding attachment is easily mountable on all agricultural tractors and machinery used in public works.
2. The novel structure of the grinding unit which permits:
    a. attacking effectively various dense vegetative materials without stress on the knives by reason of the quantity or dimension of the materials to be ground;
    b. use and easy replacement of different rotors;
    c. easy replacement of knives or cutters;
    d. use of counter-knives; and
    e. complete protection of the transmission.
3. The feasibility of utilizing the supporting arm as a multiple-use tool holder by virtue of the following features:
    a. raising by means of a linkage system and a powerful hydraulic mechanism:
    b. sturdy and telescoping arm which protects the transmission;
    c. strong, universal-type arm head for all positions, permitting the use of tools such as trench grinders, circular saws, augers, rotating brushes, suction and exhaust devices, snow turbines or blowers, and vegetals grinders.

In another, exemplary arrangement according to the invention, covered in a divisional of this application, filed Apr. 13, 1970, Ser. No. 27,882, titled "Rotor-Type Cutter," a rotor-type cutter is fitted, at the end of the supporting arm, with a novel rotary cutter designed to dig into and excavate trenches. Full details of the objects and features of this embodiment are set forth in the divisional application.

The various objects, features and advantages of the present invention will become more apparent from the following description of preferred exemplary embodiments of the rotary grinders and cutters, when considered in conjunction with the accompanying drawings, wherein.

In the following, the first exemplary embodiment of the inventive grinder will be described, with reference to FIGS. 1 to 9, also incorporating structural elements which are common to both embodiments (the rotor-type cutter forming the subject matter of the divisional being shown in FIGS. 10 to 16).

In the somewhat schematic drawings, and more particularly with reference to FIGS. 1 to 4, numeral 1 designates a tractor, 2 a grinding unit as used for the first embodiment, and 3 a carrying or supporting arm or tool holder mounted pivotally at the rear of tractor 1, and also forming part of both embodiments.

Figure 4:
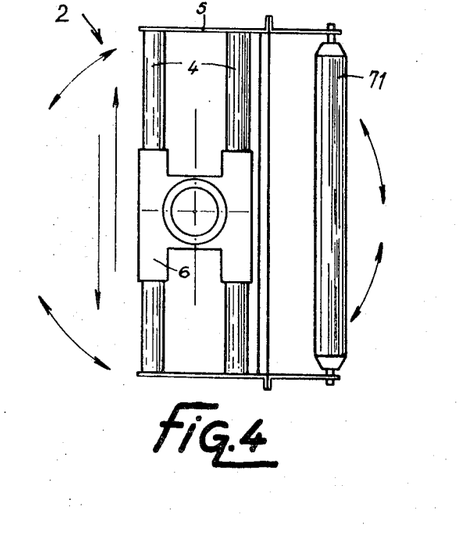
FIG. 4 is a rear view of a grinding unit forming part of the grinder of FIGS. 1 to 3.
Figure 5:
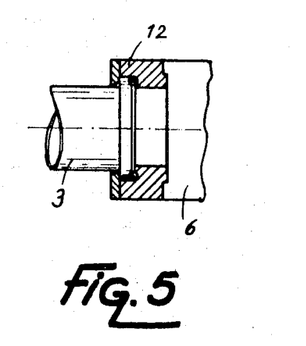
FIG. 5 is a partial view of an H-shaped articulation of the supporting arm.

The first embodiment comprises, in the grinding unit 2, two tubes 4 which are connected to a casing or cover 5 in the position as defined in FIG. 4. Along these two tubes 4 there slides an H-shaped or twin member 6 in which there is lodged a conical gearing 9 that transmits its motion to a rotary grinder or rotor 7 via a hexagonal rod 8 (also visible in FIG. 9). The rotor shaft is fitted with a chain pinion 10 (see FIG. 7) which transmits the movement to the grinder 7 by a chain 11.

Arm 3 serves as a carrier or holding member between grinding unit 2 and the engine on tractor 1. The twin member 6 of the first embodiment is connected to arm 3 through the intermediary of an articulation by means of a ball bearing 12 (detail shown in FIG. 5), this arrangement permitting the attachment of all adaptable tools (such as, for example, the rotary grinder 7 of the first embodiment of the inventive grinder or a rotary cutter 44 of the second embodiment, to be described in full detail with reference to FIGS. 10 to 16), and the positioning, at all angles, of these tools or of the grinding unit 2.

Mechanical tilting is provided in the grinder by a gear and tangential screw system 13 capable of being actuated either by a crank or a hydraulic motor (not shown).

Thus, the line or path of motive force is angled by 90°, by means of an angular shaft, with a second conical gearing 14. This mechanism is again linked to a ball bearing 15 (second articulation) whose positioning is likewise assured by a gear and tangential screw system 16, similar to elements 12, 13 previously described.

The transmission passes thus to tube 3 serving as a carrying arm and including a telescopic system 23, 24 sliding on three tubes 28 whose push-and-pull motions are executed through the aid of a double-action hydraulic unit 25, 26. The arm 3 is articulated, at its point of fixation on tractor 1, likewise by a ball bearing 17, permitting a tool attached to the head of arm 3 during use to swing or pivot in pendulum fashion, the sweep or range being in proportion to the length of arm 3. A hydraulic unit 18 (see FIGS. 1 and 10) provides this movement. It should be noted that unit 18 is being omitted from FIGS. 3 and 11 for the sake of clarity. A third conical gearing 19, set in the tractor axis, permits connection of a cardan joint 20 with a power outlet 21 of the tractor.

It will be noted from the foregoing that the structural elements common to the two exemplary inventive embodiments are those numbered 1, 3, 12 to 21, 23 to 26 and 28.

Figure 1:
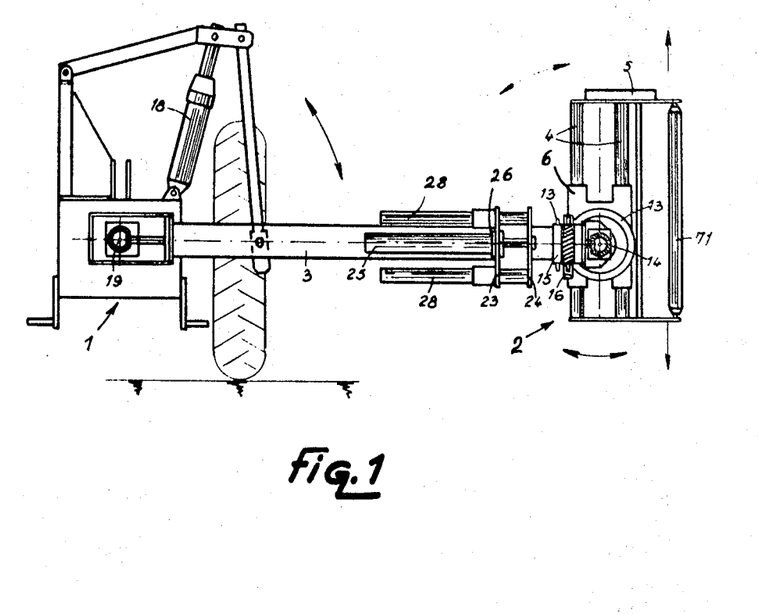
FIG. 1 is a rear view of a rotor-type grinder according to the invention, in vertical position, shown adapted to tractor use through the intermediary of a supporting arm, and fitted with a rotary grinder for chopping parasitic vegetation.
Figure 2:
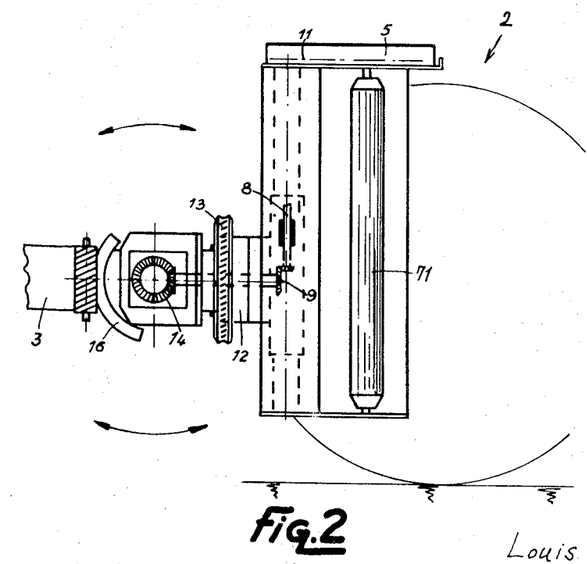
FIG. 2 is a side view of a portion of the grinder of FIG. 1.
Figure 3:
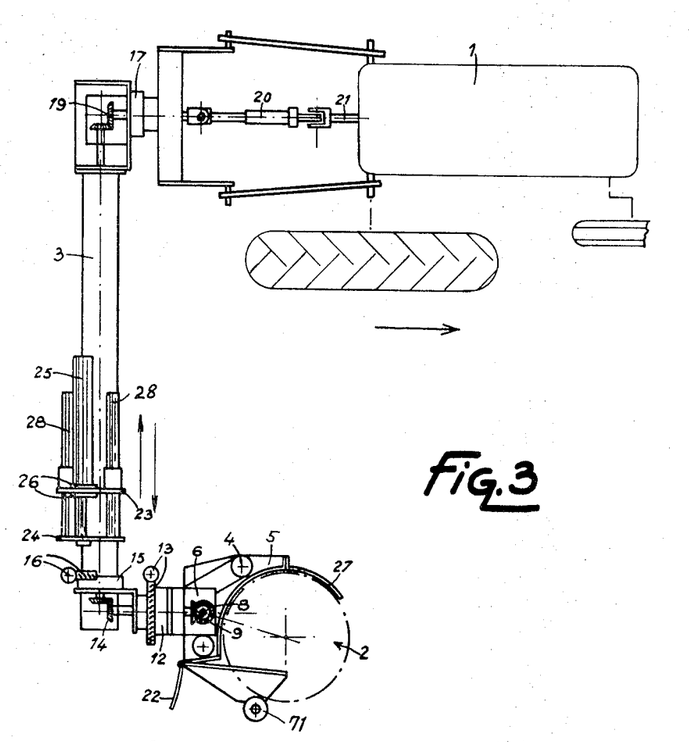
FIG. 3 is a plan view, from above, of the grinder as shown in FIGS. 1 and 2.
Figure 9:
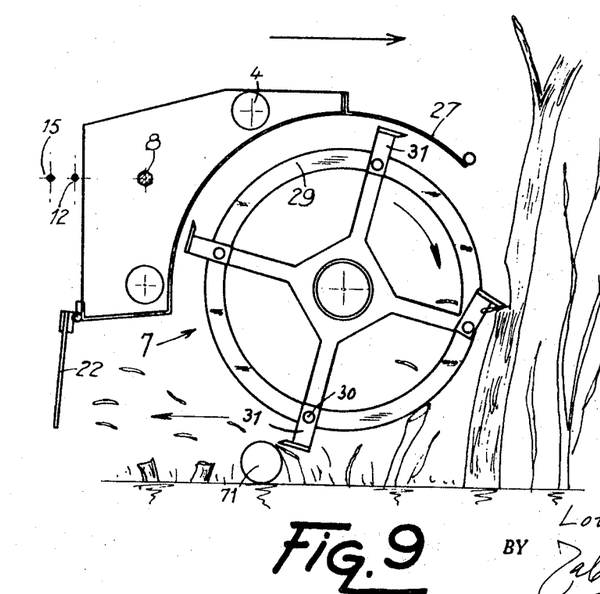
FIG. 9 is a cross-sectional transverse view of the grinder of FIGS. 1 to 3, here shown in a position parallel to the soil in an example of destructing parasitic vegetation.

The grinding unit 2 of the first embodiment has provided thereon a guard 22 and an arcuate shield 27, as shown in FIGS. 3 and 9.

Figure 6:
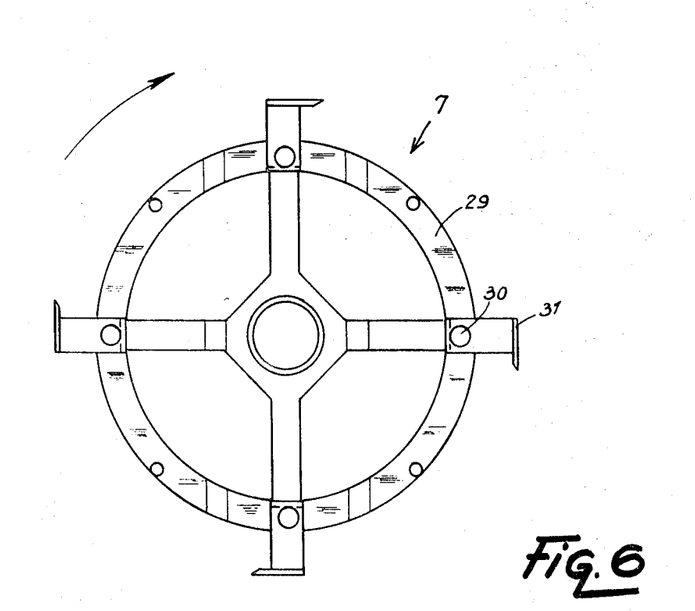
FIG. 6 is an end view of the rotary grinder usable with the apparatus of FIGS. 1 to 3.
Figure 7:
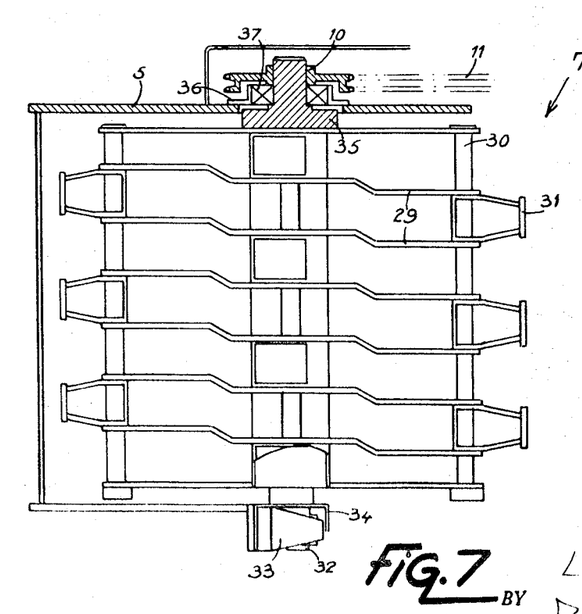
FIG. 7 is a partial plan view of the grinder shown in FIG. 6.
Figure 8:
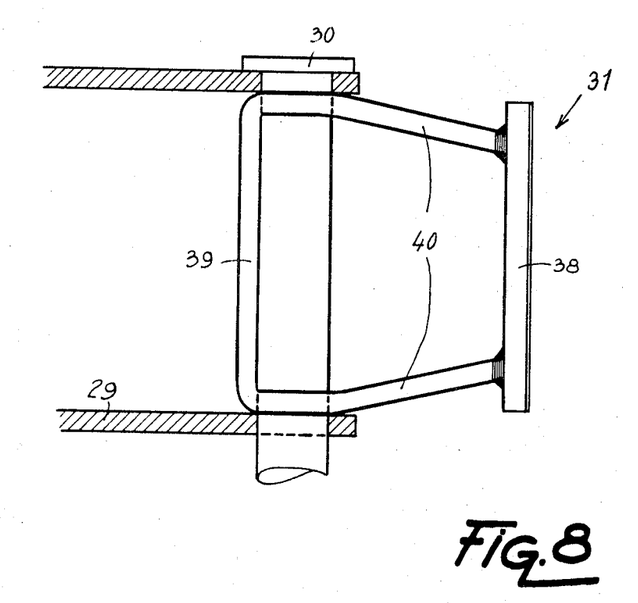
FIG. 8 is an enlarged sectional detail view of a knife and its holding assembly.

FIGS. 6 to 8 show the rotary grinder 7 and its novel system for assuring limit-of-stroke control. This grinder includes at one end a ferrule 32 enclosing a bearing 33 and a shield 34, while at the other end a cheek 35 permits easy attachment or detachment of grinder 7 on the cover 5. The connection between these parts is assured by a screw-fastened ferrule 36 enclosing a bearing 37.

The grinder 7 is provided at regular intervals along its surface perimeter with limiting discs 29 permitting the use of very short knives 31 which are afforded protection by these discs in circumstances of undue stress or violent shock caused by a sudden obstacle to the bladed action of the cutting cycle.

Once passed the obstacle, the centrifugal force of the grinder rotation returns the knives to their normal work position (see FIG. 9). To this end, the knives 31 are loosely mounted on shafts 30, as shown in FIG. 8.

These discs 29 are skewed over a portion of their circumference, as shown in FIG. 7, forming several substantially parallel sections in different planes, so as to permit total coverage of the cut surface on account of a substantially continuous cutting line produced by the rotating knives. The knives 31 that arm the grinder are designed to sever even thick branches or limbs in their chopping action, their blade edges 38 cleaving through from their setting perpendicular to the radius. In proportion to the centrifugal force and the resistance offered by the vegetation or material being cut, the blades 38 may slice through at once or in successive strokes as the effort may require.

In the latter case, under the shock effect of a cut resisting obstacle, the knife 31 is repelled to the shelter of stroke limiters 29; these latter come thereupon into contact with the obstacle to prevent its junction with knife 31 that would tend to block or warp the same or its edge 38.

On the next turn of grinder 7, the knives are outwardly projected or impelled by centrifugal force from between the discs 29 but their emergence is gradual, by several millimeters at first, and they will take on and rake relatively placid material in the bush or shrub class. With several more turns of the grinder 7, the knives develop an increasingly more positive and uniform destructive force so as to deal effectively with thicker and tougher shrubs of the terrain. The capacity of these knives 31 is practically limitless with respect to the cut diameter desired.

Each knife 31, FIG. 8, has a sharp edge or blade 38 of, for example, manganese silicon steel. The sole 39 is of mild steel. These members 38, 39 are linked by two flat irons 40, also of mild steel composition, which are almost parallel to each other but slightly inwardly bent, as shown, to permit cut material to pass between the knives, and within each knife.

These pieces are joined together, for example, by electric soldering, and are subjected to thermal treatment designed to temper the blades 38.

In FIG. 9 can be seen a roller 71 that insures separation or spacing of the grinding unit above ground such that the knives 31 of the grinder 7 do not make contact with the soil. For the work represented in FIG. 9, this same roller 71 serves as a counteredge to ensure a more efficient fragmentation of the crushed product, as well as to balance the cutting-stroke action.

It will be noted from the foregoing that the structural elements specific to the first inventive embodiment are those numbered 2, 4 to 11, 22, 27, 29 to 40 and 71.

From here on, the second embodiment of the inventive grinder will be described, with reference to FIGS. 10 to 16; the common structural elements will not be described again.

Figure 10:
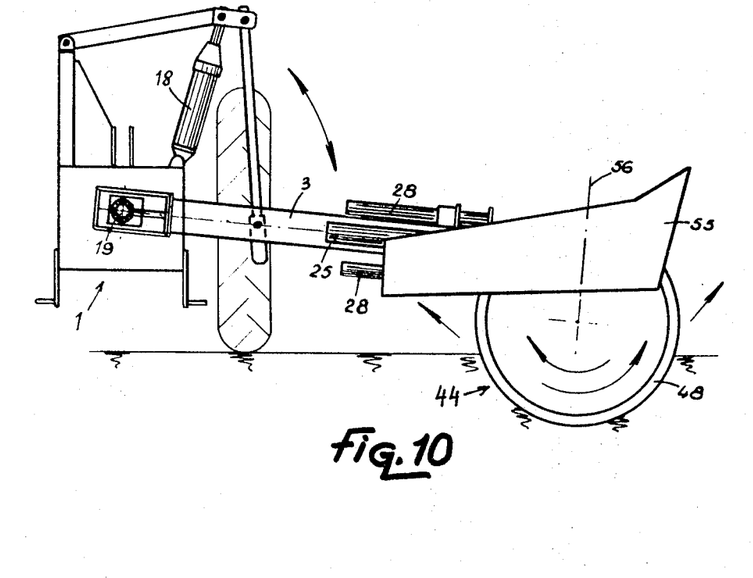
FIG. 10 is a rear view of a rotor-type cutter for digging trenches, as covered by the divisional application and presented here for the sake of information only.

The second embodiment further illustrates the applicability of the supporting arm 3 as a multiple-use tool holder. As a matter of example, the aforementioned rotary cutter 44 is attached to the end of the arm (FIGS. 10 and 11).

Figures 11, 12:
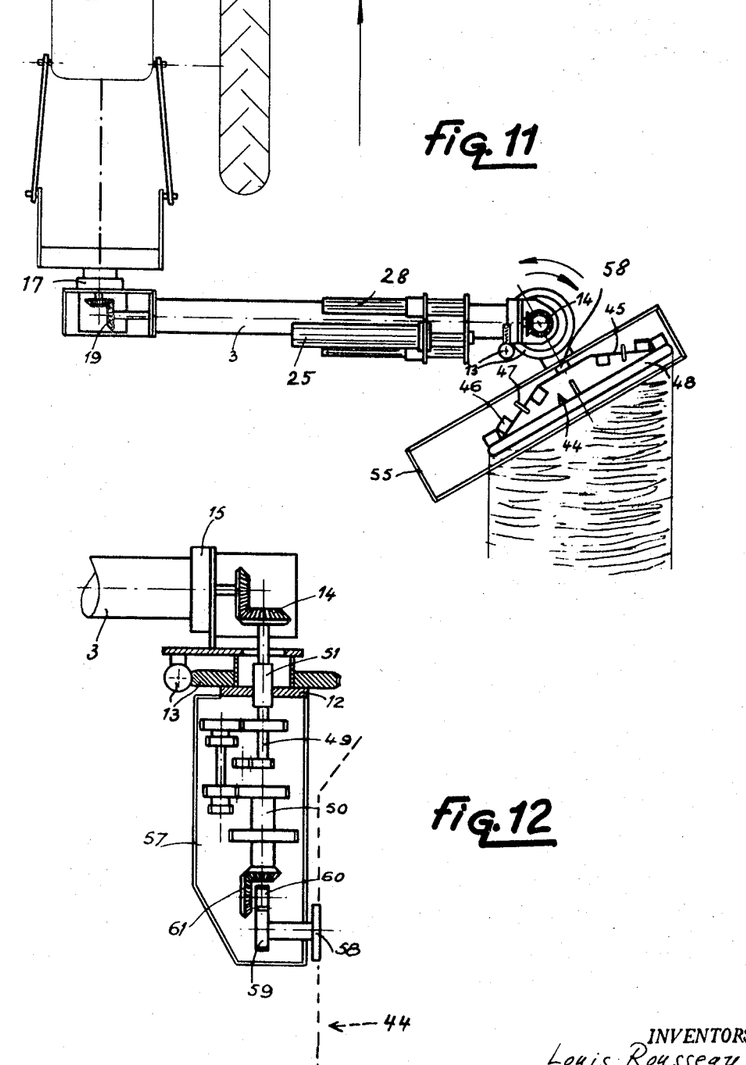
FIG. 11 is a plan view, from above, of the grinder as shown in FIG. 10, and similar to the illustration of FIG. 3.
FIG. 12 is an exploded view of the transmission or gear head of the cutter connected to the supporting arm by way of a bearing.
Figure 13:
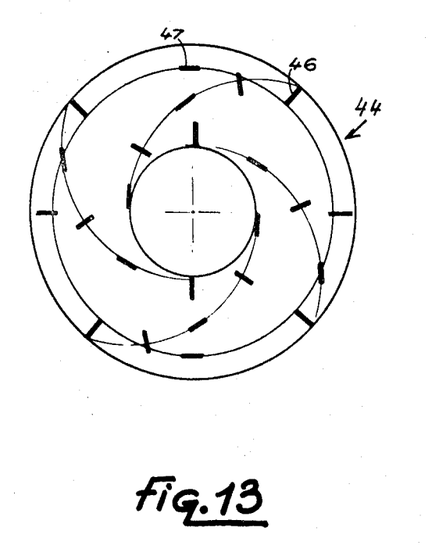
FIG. 13 is a plan view of the cutter shown in FIGS. 10 and 11.
Figure 14:
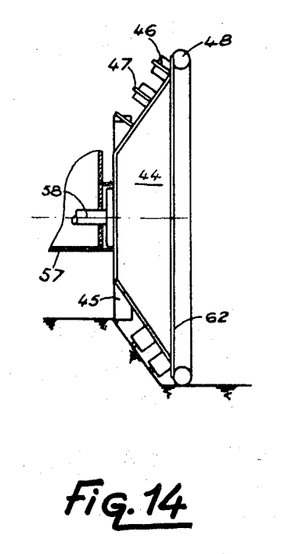
FIG. 14 is a side view of the cutter.

The cutter illustrated in these FIGS. is intended for use in excavating and clearing out depressions, this type of work requiring an output with respect to a generally horizontal plane (FIG. 10), representing the route of the tractor as indicated by the directional arrow (FIG. 11).

The pivoting of a transmission or gear casing 57 of the cutter 44 around a vertical axis 56 of the head of the supporting arm 3 is attainable through adjustability at all angles of said gear casing, for excavating and clearing trenches or various sections, ranging from the thickness or size of the cutter to its maximum diameter (FIG. 11). The arrows indicate the sense of travel of the cutter, drawn by the tractor, and show the entire unit in motion with the rotary cutter trailing, i.e., behind the tractor.

The cutter 44 is joined to gear casing 57 (FIG. 12) via a cheek shaft 58 carrying a pinion 59 which engages another pinion 60, the latter receiving the motion of a conical coupling gear 61. This conical gear is backed by a two-speed reduction gear train 50 which itself is the recipient of motion from a mechanical inverter or speed reverser 49. The outlet of this inverter is coupled by a sleeve 51 to bevel gear 14.

The cutter 44 (FIGS. 13 and 14) consists of a cone 45 and a sole 62. On the cone, detachable ejector and chopping knives 46, 47 are distributed in a helical and quincuncial array. These knives are disposed alternately as follows: an ejector knife 46 and a chopping knife 47, in the space entirely covering the surface of the cone.

Figure 15:
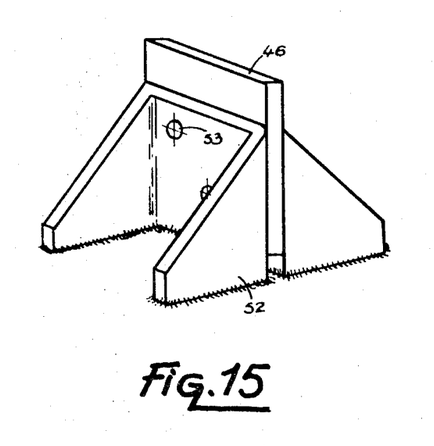
FIG. 15 shows an ejector knife and its support.
Figure 16:
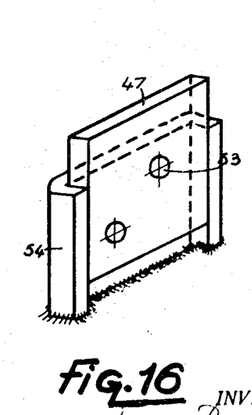
FIG. 16 shows a chopping knife and its support.

The ejector knives 46 may be fixed to supports 52 by bolts passed through bores 53 (FIG. 15). The chopping knives 47 have shoulder supports 54, their assembly is secured by bolts through bores 53 (FIG. 16).

A depth stop or limiter 48 serves to prevent the cutter 44 from getting stuck in the soil, by governing the stroke depth according to the character of the trench being worked.

A cover 55 (FIG. 10), enveloping the rotary cutter 44, and pivotable therewith, directs the expulsion of the material being evacuated or discharged.

It may be stated in closing that the elements specific to the second embodiment only are those numbered 44 to 62.

The foregoing disclosure relates only to preferred, exemplary embodiments of the invention, which is intended to cover and include all changes and modifications of the examples described within the scope of the invention as set forth in the appended claims.

We claim:

1. A rotor-type grinder comprising, in combination, a supporting arm releasably attached to a vehicle, a rotary grinder for chopping parasitic vegetation and the like, said rotary grinder being releasably attached to the outer end of said arm and including a plurality of cutting knives, an articulated mounting for said rotary grinder at said outer end of said arm for permitting the use of said rotary grinder at different angles, drive means for rotating said rotary grinder from a power drive of said vehicle, adjusting means for adjusting the position of said rotary grinder relative to the vehicle and soil, said rotary grinder including a plurality of arcuate disc members, a plurality of shafts extending through said disc members adjacent the outer peripheries thereof, said shafts being substantially equidistantly spaced about said outer peripheries, said knives being loosely mounted on said shafts, said disc members having substantially parallel skewed sections in different planes for providing full coverage of the area to be cut, said disc members having an axis of rotation, and a contact roller substantially parallel to said axis of rotation and spaced outwardly from the maximum-extended distance of the effective cutting portion of said loosely mounted knives for preventing the knives from engaging the soil surface being traversed.

2. The structure as claimed in claim 1 in which said articulated mounting comprises an H-shaped member operatively connected to said arm, said grinder including a casing having a pair of elongated tubes extending parallel and spaced from the axis of rotation of said rotary grinder, said elongated tubes being reciprocably supported in said H-shaped member.

3. The structure as claimed in claim 2 in which said grinder includes an arcuate housing spanning a sector of the path of travel of said knives, spaced from said elongated tubes and substantially parallel thereto.

4. The structure as claimed in claim 1 in which said knives comprise a pair of arms journaled on said shafts and extending radially therefrom, and a blade element extending transversely of the outer ends of said arms and generally parallel to said shafts upon which the arms are journaled whereby material being cut moves inwardly through said arms.

5. The structure as claimed in claim 1 in which said articulated mounting includes a fluid pressure operated member, and said adjusting means comprising cooperating gears.